(12) United States Patent
Prendergast (10) Patent No.: US 11,048,895 B1
(45) Date of Patent: Jun. 29, 2021

(54) DEVICE TO DETECT THE PRESENCE OF A TOOL

(71) Applicant: The Boeing Company, Chicago, IL (US)

(72) Inventor: Matthew Lee Prendergast, Covington, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/855,187

(22) Filed: Apr. 22, 2020

(51) Int. Cl.
*G06K 7/08* (2006.01)
*G06K 7/10* (2006.01)
*G06K 19/07* (2006.01)
*G01V 3/12* (2006.01)

(52) U.S. Cl.
CPC .......... *G06K 7/10366* (2013.01); *G01V 3/12* (2013.01); *G06K 19/0723* (2013.01)

(58) Field of Classification Search
CPC ... G06K 7/10366; G06K 19/0723; G01V 3/12
USPC ....................................................... 235/451
See application file for complete search history.

(56) References Cited

U.S. PATENT DOCUMENTS

| 5,725,096 | A | * | 3/1998 | Winnard | A45C 13/02 206/350 |
| 6,707,381 | B1 | * | 3/2004 | Maloney | G07G 1/0054 340/568.1 |
| 7,932,824 | B2 | * | 4/2011 | Flores | G07F 9/026 340/572.1 |
| 8,020,768 | B2 | * | 9/2011 | Ramos-Elizondo | G06Q 10/087 235/385 |
| 2006/0049947 | A1 | * | 3/2006 | Forster | G08B 13/2414 340/572.3 |
| 2016/0042310 | A1 | * | 2/2016 | Yanez Mendez | E21B 17/006 705/28 |
| 2020/0065531 | A1 | * | 2/2020 | Ellis | G06K 7/10366 |

* cited by examiner

*Primary Examiner* — Ahshik Kim
(74) *Attorney, Agent, or Firm* — Coats & Bennett, PLLC (57) ABSTRACT

A device to detect a presence of a tool by responding to a remote RFID reader. The device includes a body that forms an interior space therein with the body having a window into the interior space. An RFID tag is positioned within the interior space. A biasing member is positioned within the interior space to apply a first force in a first direction to the RFID tag. A magnet is positioned within the interior space and is configured to apply a second force in a second direction to the RFID tag when the body is in the presence of the tool. The RFID tag is movable between first and second positions within the interior space. One of the first and second positions including the RFID tag aligned with the window. The other of the first and second positions including the RFID tag positioned away from the window.

20 Claims, 7 Drawing Sheets

DEVICE TO DETECT THE PRESENCE OF A TOOL

TECHNOLOGICAL FIELD

The present disclosure relates generally to the field of devices for detecting a tool and, more specifically, to devices configured to respond to an interrogation signal and communicate the presence of a tool.

BACKGROUND

It is important that tools that are used during manufacture and/or repair be removed from a workpiece when the work is finished. Tools that are inadvertently left behind can cause issues with the workpiece during their use. The issues can be relatively minor, such as causing a rattle during use of the workpiece. In one specific example, a tool left within a wall of an automobile can rattle when the automobile is being driven. The issues can be more severe and damage the workpiece. For example, a tool that is pulled into an engine while it is running can damage the engine. In the aviation industry, this damage is referred to foreign object damage as the tool is an article that is alien to and damages the aircraft.

One current method of addressing the issue of tools being left in a workpiece is to attach an identification tag to the tool. The identification tag is then used to account for the tool when the work is completed. However, there are drawbacks to this method. Some tools have shapes that do not lend themselves to attaching a tag. This includes tools with unusual shapes and also tools that do not include an adequate surface for attaching the tag. Some tools are small relative to the tag and attaching a tag makes it difficult or not feasible to use the tool with the tag attached. Further, some tags are relatively fragile and can be damaged by the tag or when used with an attached tag.

SUMMARY

One aspect is directed to a device to detect a presence of a tool by responding to a remote RFID reader. The device comprises a body that forms an interior space therein with the body further comprising a window into the interior space. An RFID tag is positioned within the interior space. A biasing member is positioned within the interior space to apply a first force in a first direction to the RFID tag. A magnet is positioned within the interior space and is configured to apply a second force in a second direction to the RFID tag when the body is in the presence of the tool. The RFID tag is movable between first and second positions within the interior space. One of the first and second positions comprising the RFID tag aligned with the window and the other of the first and second positions comprising the RFID tag positioned away from the window.

In another aspect, the second force applied by the magnet is greater than the first force applied by the biasing member.

In another aspect, the RFID tag is visible in the window in one of the first and second positions and is not visible in the window in the other of the first and second positions.

In another aspect, the RFID tag comprises a label that is a different color than the body with the label positioned in the window and visible when the RFID tag is positioned at the window.

In another aspect, the body comprises a shield that prevents the RFID tag from receiving RF signals from the remote RFID reader.

In another aspect, the body comprises a first member constructed from a first material that allows transmission of the RF signals and the shield that is positioned within the first member and is constructed from a second material that blocks the RF signals.

In another aspect, a partition is positioned within the interior space and is movable along the interior space with the partition configured to prevent RF signals from reaching the RFID tag.

One aspect is directed to a device to detect a presence of a tool by responding to a remote RFID reader. The device (10) comprises a body that at least partially defines an interior space therein with the body further comprising a window into the interior space. An RFID tag is positioned within the interior space. A shield in the interior space prevents passage of at least one of RF signals from the RFID reader into the interior space and RF signals from the RFID tag out of the interior space. A biasing member is operatively connected to the RFID tag to apply a force that positions the RFID tag at the window to allow the RFID tag to communicate with the RFID reader. A magnet is operatively connected to the RFID tag with the magnet configured to overcome the force applied by the biasing member and move the RFID tag within the interior space dependent upon a position of the magnet relative to the tool.

In another aspect, the shield is configured to prevent the RF signals from reaching the RFID tag when the RFID tag is positioned away from the window.

In another aspect, the shield is attached to an inner side of the body.

In another aspect, the magnet applies a magnetic force that is greater than the force of the biasing member to move the RFID tag within the interior space toward the tool when the tool is positioned in proximity to the device.

In another aspect, the RFID tag comprises a label that is a different color than the body with the label positioned in the window and visible when the RFID tag is positioned at the window.

In another aspect, a shielded partition is positioned within the interior space with the shielded partition smaller than the interior space to be movable within the interior space to shield the RFID tag.

In another aspect, the RFID tag comprises a carrier with a sectional shape and size substantially similar to the interior space to be movable within the interior space and to maintain an orientation of the RFID tag relative to the body.

One aspect is directed to a method of detecting a presence of a tool by responding to a remote RFID reader. The method comprises: magnetically attracting a magnet in a device towards a tool that is in proximity to the device and moving the magnet in the device in a first direction; in response to the magnet moving in the first direction, moving an RFID tag within the device to one of a first position and a second position; after the tool is distanced from the device, removing the magnetic attraction applied by the magnet; in response to removing the magnetic attraction, moving the RFID tag within the device to the other of the first position and the second position. One of the first and second positions is configured to prevent an identification signal from being transmitted outward from the RFID tag to the remote RFID reader. The other of the first and second positions configured for transmitting the identification signal from the RFID tag outward beyond the device to the remote RFID reader.

In another aspect, preventing an identification signal from being transmitted outward from the RFID tag comprises preventing an interrogation signal from the remote RFID reader from reaching the RFID tag.

In another aspect, preventing an identification signal from being transmitted outward from the RFID tag to the remote RFID reader comprises receiving an interrogation signal that is sent from the remote RFID reader and preventing a response signal from the RFID tag from being transmitted outward beyond an interior space of the device.

In another aspect, the method comprises moving the RFID tag in the device and positioning a label on the RFID tag within a window in the device.

In another aspect, the method comprises moving the RFID tag completely away from a window in the device when the identification signal is prevented from being transmitted outward from the RFID tag to the remote RFID reader.

In another aspect, the method comprises enclosing the RFID tag within a shield when the RFID tag is positioned away from the window.

In another aspect, the method further comprises contacting a spacer that is movably positioned in an interior space of the device against a body of the device when the RFID tag is aligned in a window of the body.

The features, functions and advantages that have been discussed can be achieved independently in various aspects or may be combined in yet other aspects, further details of which can be seen with reference to the following description and the drawings.

DETAILED DESCRIPTION

Figure 1:
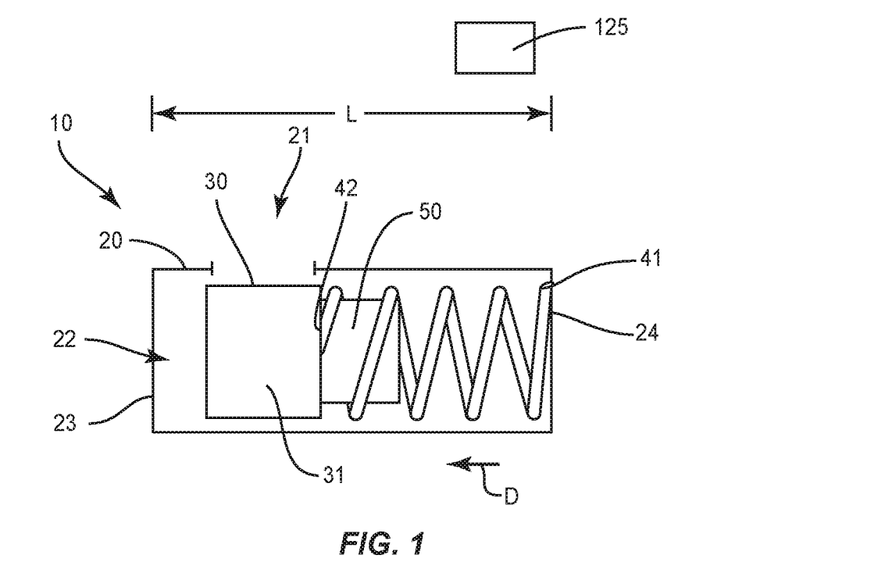
FIG. 1 is a schematic section view of a device positioned away from a tool.
Figure 2:
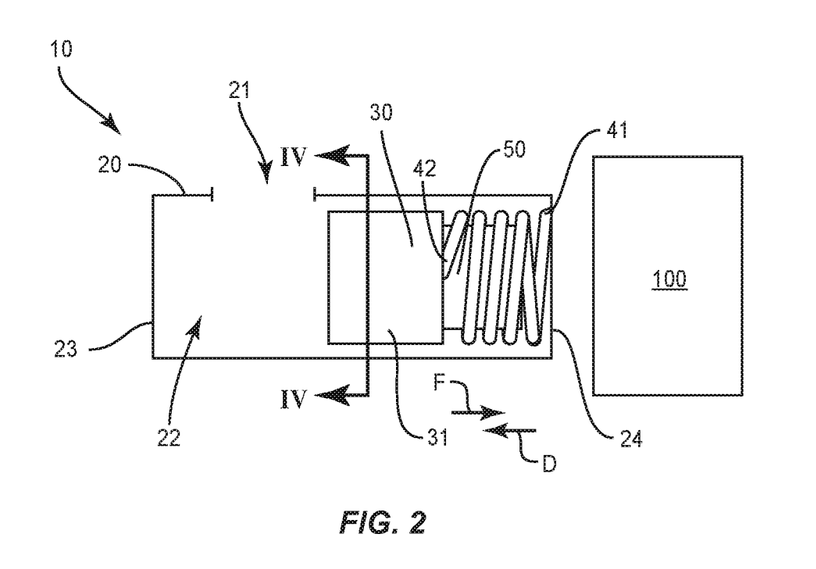
FIG. 2 is a schematic section view of the device of FIG. 1 positioned in proximity to a tool.

FIGS. 1 and 2 illustrate a device 10 for detecting the presence of a tool 100. The device 10 includes a body 20, a radio frequency identification (RFID) tag 30, a biasing member 40, and a magnet 50. When the device 10 is away from a tool as illustrated in FIG. 1, the biasing member 40 positions the RFID tag 30 in proximity to a window 21 in the body 20. This positioning provides for the RFID tag 30 to communicate with a remote RFID reader 125. This positioning also provides for the RFID tag 30 to be visible through the window 21. When the device 10 is positioned in proximity to a tool 100 that includes a ferromagnetic metal as illustrated in FIG. 2, the magnetic attraction force of the magnet 50 to the tool 100 overcomes the biasing force of the biasing member 40. This causes the RFID tag 30 to be moved away from the window 21. This position shields the RFID tag 30 and prevents communication with the remote RFID reader 125. This also prevents the RFID tag 30 from being visible in the window 21.

The body 20 extends around and forms an interior space 22 sized to contain the RFID tag 30. In one example as illustrated in FIGS. 1 and 2, the interior space 22 is also sized to contain the biasing member 40 and magnet 50. In another example, one or both of the biasing member 40 and magnet 50 are positioned outside of the interior space 22. The interior space 22 can extend the entirety of the body 20 or can extend a limited distance along the body 20.

In one example as illustrated in FIGS. 1 and 2, the body 20 includes an elongated shape with opposing first and second ends 23, 24. The length L of the body 20 measured between the first and second ends 23, 24 can vary. The body 20 can include various sectional shapes. Examples include but are not limited to circular, polygonal, oval, and triangular.

The body 20 further functions to shield the RFID tag 30 when the RFID tag 30 is positioned away from the window 21. In one example, the body 20 is constructed from a material that prevents interrogation signals from reaching the RFID tag 30 and/or prevents signals from the RFID tag 30 from reaching the remote RFID reader 125. Materials that act as an RF shield include but are not limited to steel, aluminum, and copper.

Figure 3:
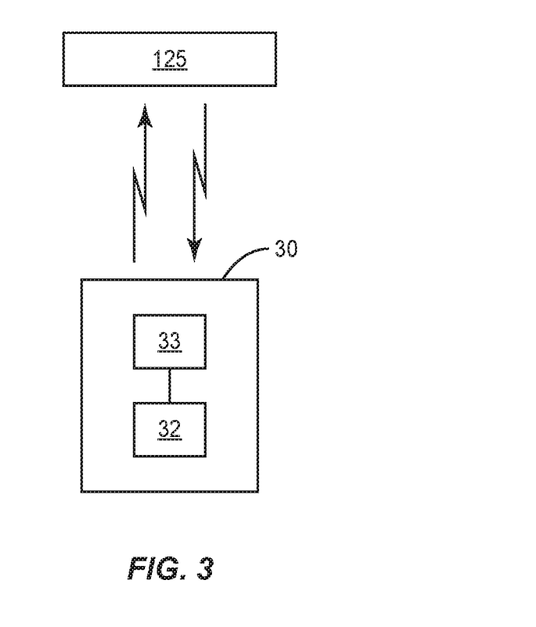
FIG. 3 is a schematic diagram of signaling between an RFID tag and a remote RFID reader.

The RFID tag 30 is movably positioned within the interior space 22. As illustrated in FIG. 3, the RFID tag 30 includes a radio receiver 32 and transmitter 33. The receiver 32 receives an interrogation signal from the remote RFID reader 125. In response, the transmitter 33 transmits a response signal. The response signal can include identifying information, such as but not limited to identification number and tool name. In one example as illustrated in FIG. 3, the RFID tag 30 is a passive device that is powered by the energy from the interrogation signal. In another example, the RFID tag 30 is an active device that is powered by a battery.

Figure 4:
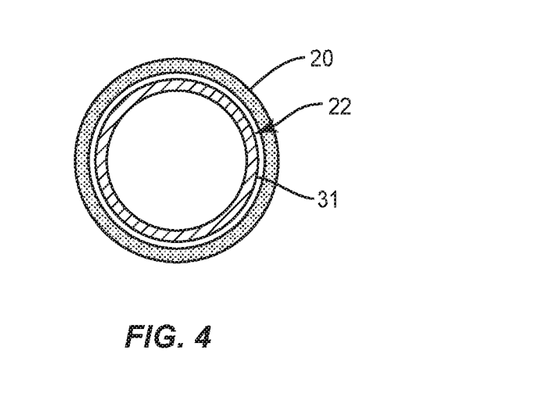
FIG. 4 is a section view cut along line IV-IV of FIG. 2.

The RFID tag 30 includes a carrier 31 sized to move along the length of the body 20. The carrier 31 can include various shapes and sizes. In one example as illustrated in FIG. 4, the carrier 31 includes the same sectional shape as the interior space 22 of the body 20 and is similar in size. This provides for the carrier 31 to slide within the interior space 22 without rotating or becoming skewed which could prevent the movement. Further, this sizing provides for the carrier 31 to be positioned in proximity to the window 21 for a label 35 that is attached to the carrier 31 to be visible through the window 21.

The biasing member 40 applies a force to the RFID tag 30 that positions the RFID tag 30 at the window 21. The biasing member 40 can include various constructions, including but not limited to a spring such as a coil spring and a leaf spring, an elastic, deformable material, and a foam material. In one example, the biasing member 40 is a compression spring that is at rest in an extended position. The biasing member 40 applies a biasing force as illustrated by arrow D that urges the RFID tag 30 outward away from the second end 24 of the body 20. When the device 10 is positioned away from the tool 100, the biasing force locates the RFID tag 30 at the window 21. When the device 10 is positioned in proximity to the tool 100, a magnetic force urges the magnet 50 in the direction of arrow F towards the tool 100. The force applied by the biasing member 40 is less than a magnetic attraction force between the magnet 50 and the tool 100. This difference causes the magnet 50 and RFID tag 30 to move towards the second end 24 of the body 20 and for the RFID tag 30 to move away from the window 21.

In one example as illustrated in FIGS. 1 and 2, the biasing member 40 includes a first end 41 that is positioned at the first end 23 of the body 20, and an opposing second end 42 that contacts against one or more of the RFID tag 30 and the magnet 50.

Figure 5:
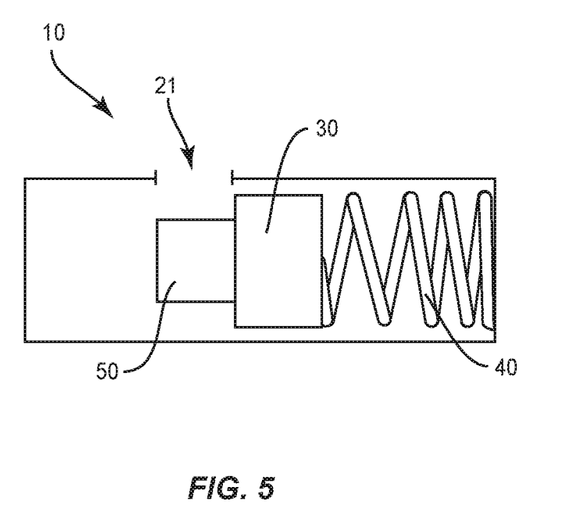
FIG. 5 is a schematic section view of a device positioned away from a tool.

The magnet 50 is positioned on the body 20 and is magnetically attracted to the tool 100. In one example as illustrated in FIGS. 1 and 2, the magnet 50 is attached to the RFID tag 30 and positioned between the RFID tag 30 and the second end 24 of the body 20. In one example, the biasing member 40 50 is formed as a coil and the magnet 50 is positioned within the center of the coil. In another example as illustrated in FIG. 5, the magnet 50 is positioned on an opposing side of the RFID tag 30 with the RFID tag 30 positioned between the magnet 50 and the biasing member 40. The biasing member 40 can include a variety of different shapes and configurations. The biasing member 40 can include different types of springs, including but not limited to tension springs and compression springs.

As illustrated in FIG. 2, the magnet 50 applies a force F that overcomes the opposing force D applied by the biasing member 40. The force causes the magnet 50 to move the RFID tag 30 along the interior space 22 and towards the tool 100 that is positioned at the second end 24.

Figure 6:
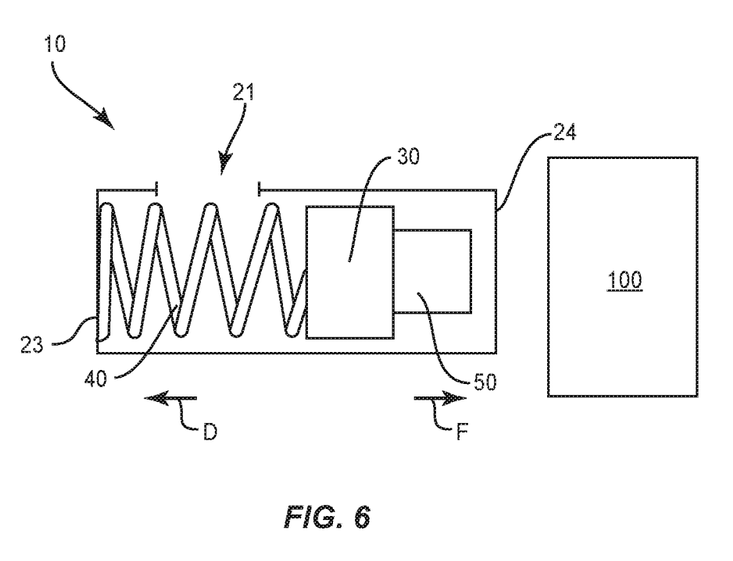
FIG. 6 is a schematic section view of a device positioned in proximity to a tool.

FIG. 6 illustrates another example of a device 10 having the biasing member 40 on an opposing side of the RFID tag 30. In one example, the biasing member 40 is an extension spring that is at rest when in a tight coil to position the RFID tag 30 at the window 21. A magnet 50 is operatively connected on an opposing side of the RFID tag 30. The magnet 50 applies a force F to the RFID tag 30 when the device 10 is positioned in proximity to the tool 100. As illustrated in FIG. 6, the force F applied by the magnet 50 is greater than a force D exerted by the biasing member 40 and moves the RFID tag 30 away from the window 21 when the device 10 is positioned in proximity to the tool 100.

Figure 7:
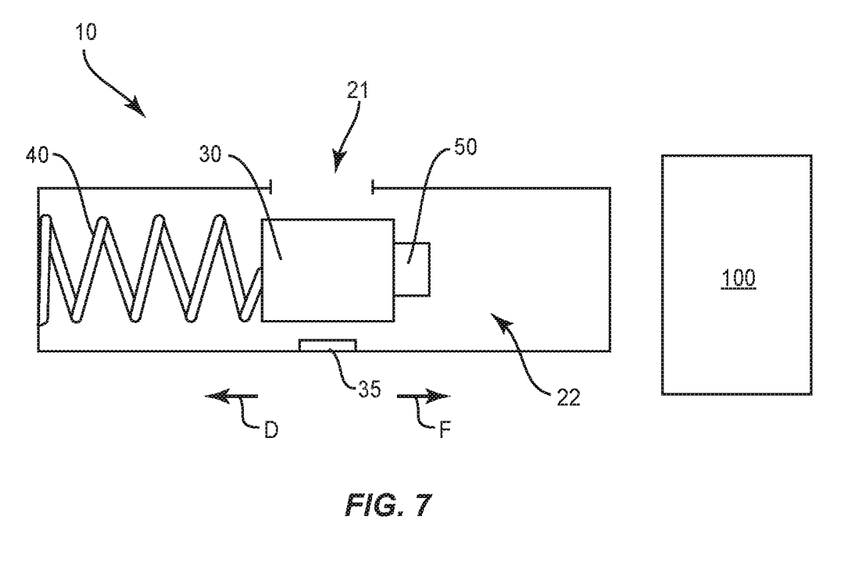
FIG. 7 is a schematic section view of a device positioned in proximity to a tool.
Figure 8:
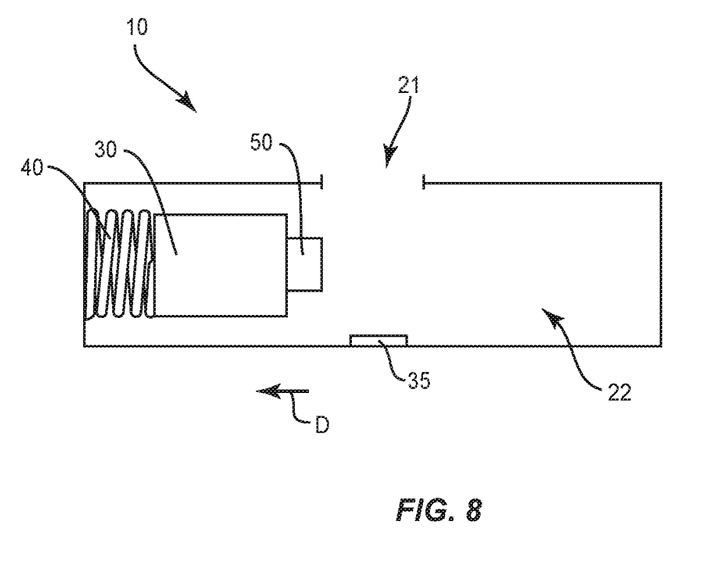
FIG. 8 is a schematic section view of the device of FIG. 7 positioned away from the tool.

In the examples disclosed above, the device 10 functions to position the RFID tag 30 at the window 21 when the device 10 is positioned away from the tool 100. In other examples, the device 10 is configured for the RFID tag 30 to be positioned away from the window 21 when the device 10 is positioned away from the tool 100. FIGS. 7 and 8 illustrate an example with a biasing member 40, such as an extension spring, applying a force D to the RFID tag 30 in a first direction. When the device 10 is in proximity to the tool 100 as illustrated in FIG. 7, the force F exerted by the magnet 50 pulls the RFID tag 30 towards the tool 100. This positions the RFID tag 30 in the window 21 where it can signal the RFID reader 125. When the device 10 is positioned away from the tool 100 as illustrated in FIG. 8, the force D of the biasing member 40 moves the RFID tag 30 away from the window 21 to a shielded position where the RFID tag 30 is unable to signal the RFID reader 125.

Various configurations of devices 10 with different types and positioning of the biasing member 40 relative to the RFID tag 30 are considered within the scope of the present application. In each example, the RFID tag 30 is moveable between first and second positions. One of the positions is a shielded position in which signals from the RFID tag 30 are able to reach the RFID reader 125. A second one of the positions shields the RFID tag 30 and prevents signals from reaching the RFID reader 125.

Figure 9:
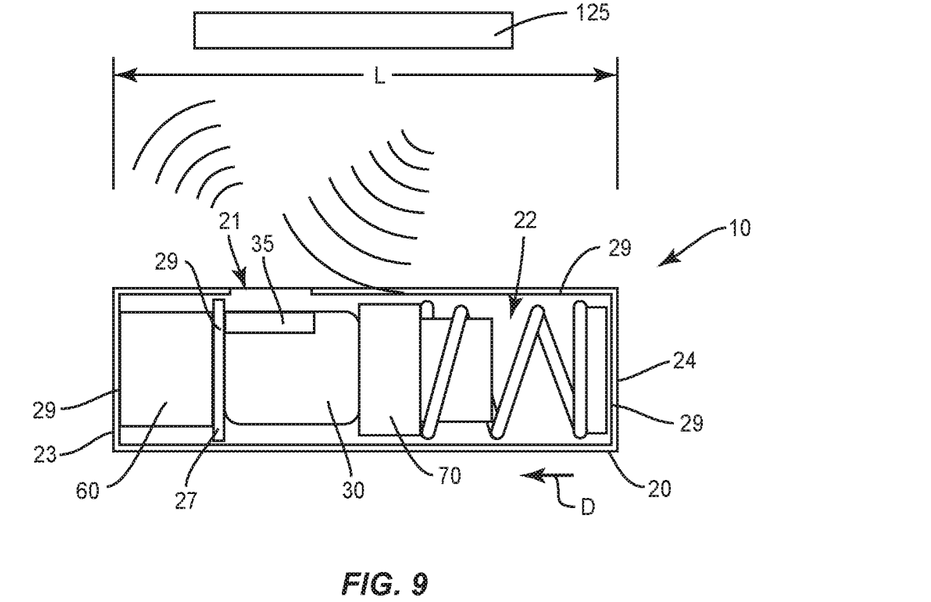
FIG. 9 is a schematic section view of a device positioned away from a tool.
Figure 10:
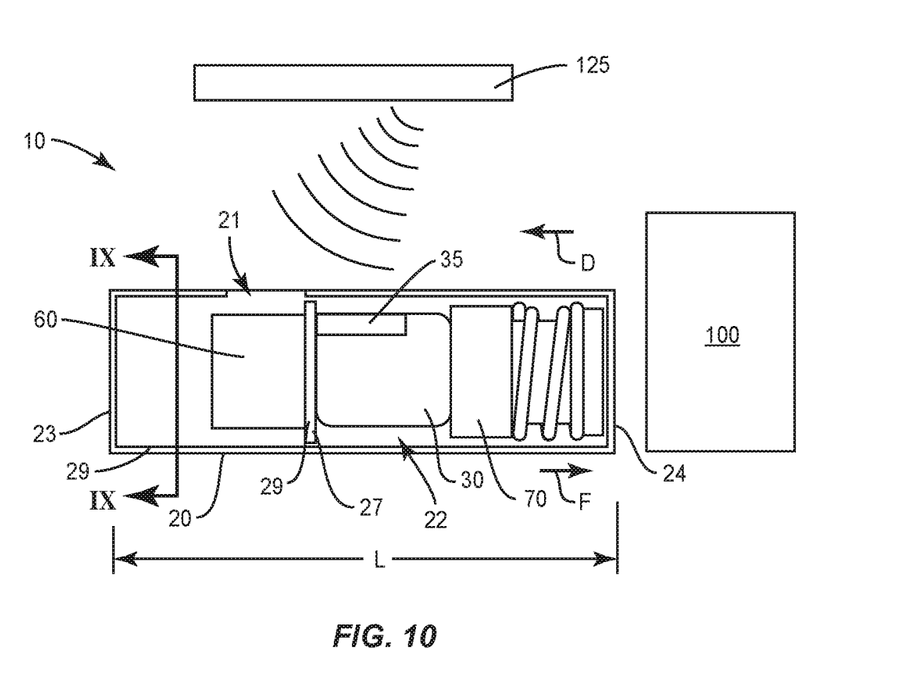
FIG. 10 is a schematic section view of the device of FIG. 9 positioned in proximity to a tool.

FIGS. 9 and 10 illustrate another example of a device 10. The body 20 includes an elongated shape with a first end 23 and opposing second end 24. An open interior space 22 extends within the body 20 between the first and second ends 23, 24. In one example, the body 20 is constructed of a material that shields the RFID tag 30 that is positioned in the interior space 22. In another example as illustrated, the body 20 includes a separate shield 29 that is constructed from a material that shields the RFID tag 30.

Figure 11:
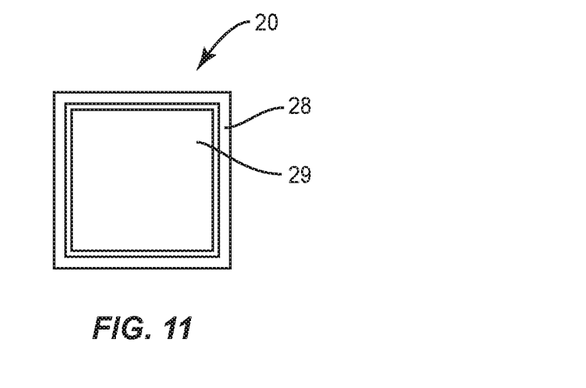
FIG. 11 is a schematic section view of a body that includes a shield attached to an inner side of a first member.

In one example as illustrated in FIG. 11, the body 20 includes a first member 28 and the shield 29 is attached to the inner side of the first member 28. In a similar example, the shield 29 is attached to an outer side of the first member 28. The shield 29 can be separate from the first member 28 and can be positioned on the interior or exterior. In one example, a gap is positioned between the shield 29 and the first member 28.

In one example, the body 20 includes a first member 28 constructed from a first material that allows transmission of the RF signals and the shield 29 that is positioned within the first member 28 is constructed from a second material that blocks the RF signals. In another example, both the first member 28 and the shield 29 are constructed from materials that block the RF signals. These may include the same or different materials.

Figure 12:
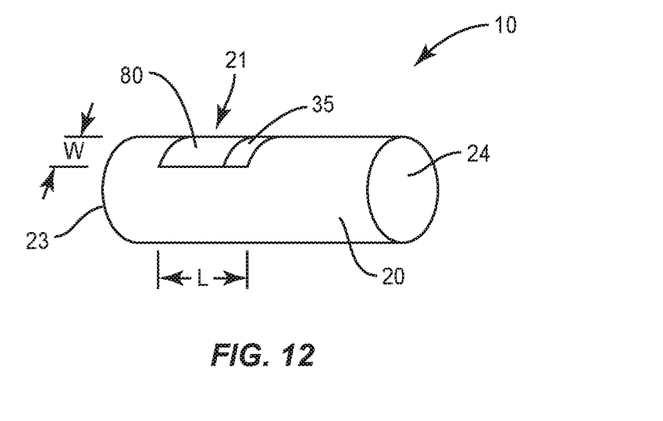
FIG. 12 is a perspective view of a device that includes a label positioned in a window.

The window 21 extends through the body 20 and into the interior space 22. As illustrated in FIG. 12, the window 21 includes a width W and a length L. The window 21 can include various shapes and sizes. In one example, the window 21 is open. In another example, the window 21 includes a transparent material 80 as illustrated in FIG. 12 that provides for the user to visually see into the interior space 22 and to see the RFID tag 30. The transparent material 80 allows for the transmission of the RF signals.

The entirety or one or more sections of the interior space 22 can be hermetically sealed. This prevents the ingress of debris and/or water that could prevent transmission of RF signals and/or movement of the RFID tag 30 within the interior space 22.

In the example of FIGS. 9 and 10, a partition 27 is movably positioned within the interior space 22. The partition 27 includes a shield 29 to shield the RFID tag 30. Accordingly, the partition 27 can be referred to as a shielded partition. In one example, the shape of the partition 27 substantially matches the sectional shape of the interior space 22. The matching sizes provide for the partition 27 to shield the RFID tag 30 and also is maintains its rotational position relative to the body 20 during movement along the length L of the body 20. This prevents the partition 27 from becoming jammed in the interior space 22 to prevent movement. The partition 27 can also prevent debris or water that enters into the interior space 22 from contacting against one or more of the RFID tag 30, biasing member 40, and magnet 50.

A spacer member 60 is positioned in the interior space 22 between the partition 27 and the first end 23. The spacer member 60 limits the extent of movement of the RFID tag 30 along the length L of the body 20. As illustrated in FIG.

9, the spacer member 60 contacts against the body 20 at the first end 23 to position the RFID tag 30 at the window 21 when the device 10 is positioned away from a tool 100. In one example, the spacer member 60 is hollow to reduce the weight of the device 10.

As illustrated in FIGS. 9 and 10, a label 35 is positioned on the side of the RFID tag 30 that faces towards the window 21. The label 35 is configured to be readily seen by a user when the RFID tag 30 is aligned with the window 21. The label 35 is a separate member that is attached to the carrier 31 of the RFID tag 30. The label 35 can include various configurations, including but not limited to a coating (e.g., paint) and a thin layer of material that is attached with an adhesive.

In one example, the label 35 is colored a unique or different color from the remainder of the device 10 to be readily visible when aligned in the window 21. Examples of color include but are not limited to red, orange, and yellow. The label 35 can also include indicia such as alphanumeric characters or symbols to again facilitate the visibility. The label 35 can include one or more colors or indicia to facilitate the visibility.

The size of the label 35 can vary. In one example, the label 35 is the same size or larger than the window 21 and extends across the entirety of the window 21 when the device 10 is in the first position. In another example as illustrated in FIG. 12, the label 35 is smaller than the window 21 and extends across a limited section.

In one example as illustrated in FIGS. 7 and 8, the label 35 is positioned in the interior space 22 of the body 20, such as an a surface that is exposed through the window 21. When the RFID tag 30 is not positioned at the window 21 as illustrated in FIG. 8, the label 35 is visible to a user through the window 21. When the RFID tag 30 is positioned at the window 21 as illustrated in FIG. 7, the label 35 is blocked from view.

In one example, the biasing member 40 urges the RFID tag 30 outward away from the second end 24 of the body 20 and locates the label 35 within the window 21 when the device 10 is not in proximity to a tool 100. In one example as illustrated in FIGS. 9 and 10, the biasing member 40 contacts against a connector member 70. The connector member 70 is connected to the RFID tag 30 and is shaped and sized to move along the length L of the interior space 22.

In one example as illustrated in FIG. 9, the biasing member 40 urges the RFID tag 30 towards the window 21. The force applied by the biasing member 40 causes the spacer member 60 to contact against the body 20 at the first end 23. The force further maintains the spacer member 60 in contact with the first end 23 of the body 20 and prevents the label 35 from moving out of the window 21 when the device 10 is positioned away from a tool 100.

The magnet 50 is positioned in the interior space 22. The magnet 50 is attracted to the tool 100 when the tool 100 is positioned in proximity to the second end 24. This force F causes the magnet 50 to move along the length L of the interior space 22 towards the second end 24. The magnet 50 is operatively connected to the RFID tag 30 such that the RFID tag 30 also moves within the interior space 22 towards the second end 24. In one example, the magnet 50 contacts against the second end 24. In another example, the magnet 50 remains spaced from the second end 24.

Figure 13:
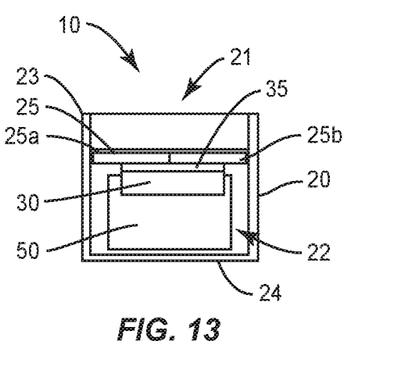
FIG. 13 is a schematic section view of a device positioned away from a tool.
Figure 14:
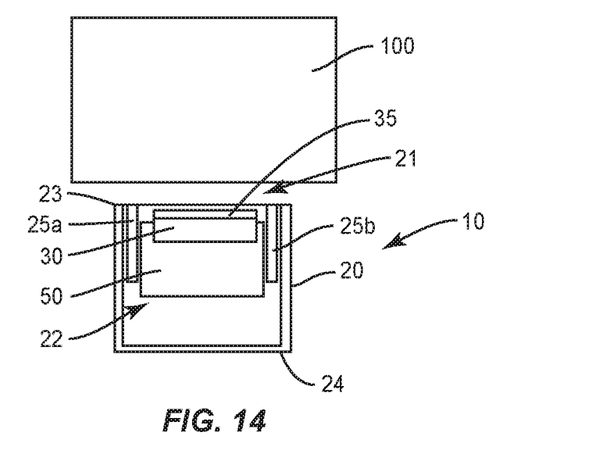
FIG. 14 is a schematic section view of the device of FIG. 13 positioned in proximity to a tool.

The devices 10 disclosed above are configured with the RFID tag 30 laterally movable within the body 20 and relative to the window 21 between the first and second positions. This type of device 10 is referred to as having a horizontal orientation. FIGS. 13 and 14 illustrate a device 10 with the RFID tag 30 vertically movable within the body 20 and remaining aligned with the window 21 in both the first and second positions. The RFID tag 30 is shielded by an iris 25 that extends across the window 21. This type of device 10 is referred to as having a vertical orientation.

As illustrated in FIGS. 13 and 14, the body 20 includes a window 21 at the first end 23. The window 21 opens into the interior space 22 formed within the body 20. An RFID tag 30 with a label 35 is positioned within the interior space 22. A magnet 50 is attached to the RFID tag 30. An iris 25 that includes first and second sections 25a, 25b is positioned between the RFID tag 30 and the window 21.

The iris 25 is constructed to shield the RFID tag 30 when in the closed position as illustrated 13. The iris 25 is movable within the interior space 22 between the open and closed positions. In one example, each of the first and second sections 25a, 25b includes a hinge or pin about which it pivots. In another example, each of the first and second sections 25a, 25b is positioned in a track which provides for the movement. In one example, a shield can extend along the interior of the body 20 to further shield the RFID tag.

In use, the device 10 is positioned with the window 21 facing outward and being vertically elevated. This device 10 assumes the first position as illustrated in FIG. 13 when distanced from a tool 100. The iris 25 is positioned over the RFID tag 30 and forms a shield thus preventing communication with the RFID reader 125. The iris 25 further prevents visual detection of the label 35. In this first position, the RFID tag 30 is positioned in a lower section of the interior space 22 (i.e., away from the first end 23).

When the device 10 is positioned in proximity to the tool 100 as illustrated in FIG. 14, the magnet 50 is attracted to the tool 100. The attraction force causes the magnet 50 and attached RFID tag 30 to move upward within the interior space 22 towards the first end 23. The movement causes the iris 25 to open and expose the RFID tag 30 in the window 21. In one example, the first and second sections 25a, 25b move apart thus allowing for the RFID tag 30 and magnet 50 to move vertically upward in the interior space 22. In the second position, signals from the RFID tag 30 can reach the RFID reader 125. Further, the label 35 is exposed for visual identification.

When the tool 100 is moved away from the device 10, the RFID tag 30 and magnet 50 return towards the second end 24 of the body 20. The first and second sections 25a, 25b return to the closed position to shield the RFID tag 30.

In one example, the first and second sections 25a, 25b tend towards the closed position due to gravity. The attraction force of the magnet 50 overcomes the gravity force and provides for the first and second sections 25a, 25b to open. In another example, biasing members such as springs are attached to each of the first and second sections 25a, 25b to bias them towards the closed position. The force applied by the biasing members is overcome by the magnetic force when the device 10 is positioned in proximity to the tool 100.

Figure 15:
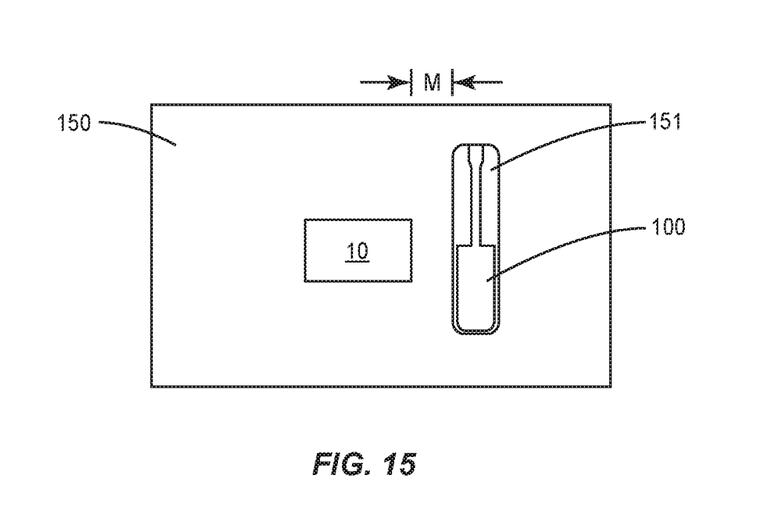
FIG. 15 is a schematic view of a tool holder that includes a device positioned in proximity to a receptacle configured to hold a tool.

FIG. 15 illustrates a device 10 mounted in a tool holder 150. The device 10 is positioned in proximity to a receptacle 151 configured to hold a tool 100. The receptacle 151 can include various structures to attach to the tool 100, such as fasteners, adhesives, straps, cords, and a friction fit. When the tool 100 is mounted in the receptacle 151, the device 10 is positioned with the label 35 on the RFID tag 30 not being visible within the window 21. This provides for the user to visually determine that the tool 100 is located in the receptacle 151. This positioning also shields the RFID tag 30 and prevents the interrogation signal from the remote RFID reader 125 from reaching the RFID tag 30 and/or from a response signal from the RFID tag 30 from being transmitting outward from the device 10.

The device 10 is positioned away from the receptacle 151 by a distance M. This distance is sized such that when the tool 100 is mounted in the receptacle 151, the magnet 50 in the device 10 is attracted to the ferromagnetic material in the tool 100. The distance M can vary depending upon one or more of the type and amount of ferromagnetic material, and the characteristics of the magnet 50.

FIG. 15 illustrates a tool holder 150 with a single device 10. In other examples, the tool holder 150 includes multiple devices 10 each positioned to detect the presence of a different tool. The devices 10 are positioned in the tool holder 150 for the user to visually see each window 21 to determine if the tools 100 are in their respective receptacle 151 of the tool holder 150.

The tool holder 150 can be a foam material or other substrate with the receptacles 151 having shapes corresponding to the tool 100 and the device 10 cut into the material. The tool 100 and device 10 are inserted into the corresponding receptacles 151 and are secured in place via friction against the material of the tool holder 150.

In another example, the tool holder 150 includes a deformable and/or conformable material, such as compression foam, that allows the tool 100 and device 10 to be pressed into the material. The material deforms to conform to the shape of the tool 100 and the device 10 to create the receptacles 151. The friction between the tool holder 150 material and the tool 100 and the device 10 secures the tool 100 and the device 10 in position with respect to each other and to the tool holder 150. In one example, the material rebounds towards the original position and can be reshaped to accept new tools 100 and/or devices 10. Use of this type of material avoids the time necessary with some other materials to cut-out the receptacles 151. Further, the amount of wasted material that is removed is eliminated and/or reduced. In one example that used deformable and/or conformable material, an additional securing feature may be necessary to prevent the tool 100 and/or device 10 from inadvertently falling out of the tool holder 150. Various types of securing features can be used, such as but not limited to a releasable adhesive, or strap with a buckle, snap attachment, of hook-and-loop attachment.

In one example, the material that forms the one or more receptacles 151 has a color that is different than the tools 100. This difference in color enhances the ability of a user to determine if a tool 100 is missing from the tool holder 150.

Figure 16:
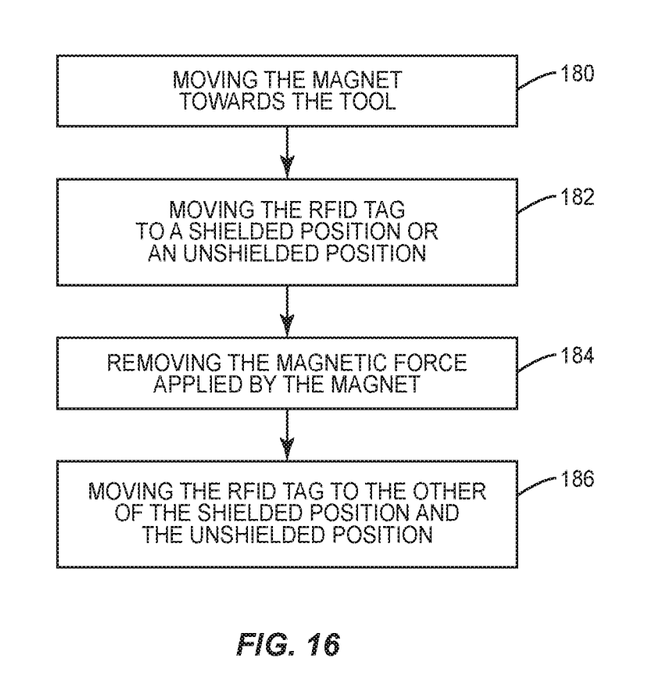
FIG. 16 is a flowchart diagram of a method of detecting a presence of a tool 100.

FIG. 16 illustrates a method of detecting a presence of a tool 100. The device 10 and tool 100 are positioned in proximity to magnetically attract a magnet 50 in the device 10 towards the tool 100 thereby moving the magnet 50 in the device 10 in a first direction (block 180). In response to the magnet 50 moving in the first direction, an RFID tag (30) is moved to either a shielded position or an unshielded position within the tool 100 (block 182).

With the RFID tag 30 in the shielded position, an identification signal is prevented from being transmitted outward from the RFID tag 30. In one example, this includes preventing and/or reducing signals from a remote RFID reader 125 from reaching the RFID tag 30 that is positioned in the interior space 22 of the device 10. In another example, this includes preventing a response signal transmitted by the RFID tag 30 from being transmitted outward beyond the body 20 of the device 10. In another example, the incoming signal is shielded from reaching the RFID tag 30 and a signal from the RFID tag 30 is prevented from being transmitted outward beyond the device 10.

With the RFID tag 30 in the unshielded position, an interrogation signal from the remote RFID reader 125 reaches the RFID tag 30 and causes the RFID tag 30 to transmit a response signal that is received by the remote RFID reader 125.

At some time thereafter, the tool 100 and device 10 are moved apart. This removes the magnetic attraction applied by the magnet 50 (block 184). With the magnetic force removed, the RFID tag 30 is moved to the other of the shielded position and the unshielded position (block 186).

In the various examples, the tool 100 includes a material that is magnetically attracted to the magnet 50. The tool 100 can include various amounts of the material to provide the magnetic force to be applied by the magnet 50. Examples of materials include but are not limited to iron, nickel, and various alloys such as steel.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A device to detect a presence of a tool by responding to a remote RFID reader, the device comprising:
    a body that forms an interior space therein, the body further comprising a window into the interior space;
    an RFID tag positioned within the interior space, the RFID tag movable between first and second positions within the interior space, wherein one of the first and second positions comprising the RFID tag aligned with the window and the other of the first and second positions comprising the RFID tag positioned away from the window;
    a biasing member positioned within the interior space to apply a first force in a first direction to the RFID tag; and
    a magnet positioned within the interior space and configured to apply a second force in a second direction to the RFID tag when the body is in the presence of the tool.

2. The device of claim 1, wherein the second force applied by the magnet is greater than the first force applied by the biasing member.

3. The device of claim 1, wherein the RFID tag is visible in the window in one of the first and second positions and is not visible in the window in the other of the first and second positions.

4. The device of claim 1, wherein the RFID tag comprises a label that is a different color than the body, the label is positioned in the window and is visible when the RFID tag is positioned at the window.

5. The device of claim 1, wherein the body comprises a shield that prevents the RFID tag from receiving RF signals from the remote RFID reader.

6. The device of claim 5, wherein the body comprises a first member constructed from a first material that allows transmission of the RF signals and the shield that is positioned within the first member and is constructed from a second material that blocks the RF signals.

7. The device of claim 1, further comprising a partition that is positioned within the interior space and is movable along the interior space, the partition configured to prevent RF signals from reaching the RFID tag.

8. A device to detect a presence of a tool by responding to a remote RFID reader, the device comprising:
   a body that at least partially defines an interior space therein, the body further comprising a window into the interior space;
   an RFID tag positioned within the interior space;
   a shield in the interior space to prevent passage of at least one of RF signals from the RFID reader into the interior space and RF signals from the RFID tag out of the interior space;
   a biasing member operatively connected to the RFID tag to apply a force that positions the RFID tag at the window to allow the RFID tag to communicate with the RFID reader; and
   a magnet operatively connected to the RFID tag, the magnet configured to overcome the force applied by the biasing member and move the RFID tag within the interior space dependent upon a position of the magnet relative to the tool.

9. The device of claim 8, wherein the shield is configured to prevent the RF signals from reaching the RFID tag when the RFID tag is positioned away from the window.

10. The device of claim 8, wherein the shield is attached to an inner side of the body.

11. The device of claim 8, wherein the magnet applies a magnetic force that is greater than the force of the biasing member to move the RFID tag within the interior space toward the tool when the tool is positioned in proximity to the device.

12. The device of claim 8, wherein the RFID tag comprises a label that is a different color than the body, the label positioned in the window and is visible when the RFID tag is positioned at the window.

13. The device of claim 8, further comprising a shielded partition positioned within the interior space, the shielded partition is smaller than the interior space to be movable within the interior space to shield the RFID tag.

14. The device of claim 8, wherein the RFID tag comprises a carrier with a sectional shape and size substantially similar to the interior space to be movable within the interior space and to maintain an orientation of the RFID tag relative to the body.

15. A method of detecting a presence of a tool by responding to a remote RFID reader, the method comprising:
   magnetically attracting a magnet in a device towards the tool that is in proximity to the device and moving the magnet in the device in a first direction;
   in response to the magnet moving in the first direction, moving an RFID tag within the device to one of a first position and a second position;
   after the tool is distanced from the device, removing the magnetic attraction applied by the magnet; and
   in response to removing the magnetic attraction, moving the RFID tag within the device to the other of the first position and the second position;
   one of the first and second positions configured to prevent an identification signal from being transmitted outward from the RFID tag to the remote RFID reader; and
   the other of the first and second positions configured for transmitting the identification signal from the RFID tag outward beyond the device to the remote RFID reader.

16. The method of claim 15, wherein preventing an identification signal from being transmitted outward from the RFID tag to the remote RFID reader comprises preventing an interrogation signal from the remote RFID reader reaching the RFID tag.

17. The method of claim 15, wherein preventing an identification signal from being transmitted outward from the RFID tag to the remote RFID reader comprises receiving an interrogation signal that is sent from the remote RFID reader and preventing a response signal from the RFID tag from being transmitted outward beyond an interior space of the device.

18. The method of claim 15, further comprising moving the RFID tag in the device and positioning a label on the RFID tag within a window in the device.

19. The method of claim 18, further comprising moving the RFID tag completely away from the window in the device when the identification signal is prevented from being transmitted outward from the RFID tag to the remote RFID reader.

20. The method of claim 15, further comprising contacting a spacer that is movably positioned in an interior space of the device against a body of the device when the RFID tag is aligned in a window.

\* \* \* \* \*